United States Patent [19]

Bakewell, Jr.

[11] 3,961,304

[45] June 1, 1976

[54] DECOUPLED HYDROPHONE WITH REDUCED RESPONSE TO VIBRATION AND STRESS CONCENTRATION

[75] Inventor: Henry P. Bakewell, Jr., Old Saybrook, Conn.

[73] Assignee: The United States of America as represented by the Secretary of the Navy, Washington, D.C.

[22] Filed: Oct. 21, 1974

[21] Appl. No.: 516,330

[52] U.S. Cl. .............................. 340/7 R; 340/8 LF; 340/10

[51] Int. Cl.[2] .................... G01V 1/00; H04B 13/00; H04R 15/00

[58] Field of Search .................. 340/8 C, 8 LF, 8 S, 340/8 PC, 9, 10, 17, 7 R; 310/8.9, 9, 9.1

[56] References Cited

UNITED STATES PATENTS

| | | | |
|---|---|---|---|
| 3,144,090 | 8/1964 | Mazzagatti et al. | 340/10 |
| 3,167,668 | 1/1965 | Nesh | 310/9.1 |
| 3,178,681 | 4/1965 | Horsman et al. | 340/10 |
| 3,263,208 | 7/1966 | Douglas et al. | 340/10 |
| 3,480,907 | 11/1969 | King | 340/9 |
| 3,739,326 | 6/1973 | Kerr et al. | 310/9.1 |

*Primary Examiner*—Maynard R. Wilbur
*Assistant Examiner*—T. M. Blum
*Attorney, Agent, or Firm*—Richard S. Sciascia; Arthur A. McGill; Prithvi C. Lall

[57] ABSTRACT

A pressure sensitive hydrophone assembly which provides an undiminshed acoustic sensitivity while discriminating against waves induced in the material surrounding the hydrophone elements by flow and/or vibrational excitation. The hydrophone comprises a ceramic element surrounded by a rigid barrier and an elastic material inside the rigid barrier which is constructed to preclude the arrival of undesired forces at the ceramic element.

7 Claims, 3 Drawing Figures

DECOUPLED HYDROPHONE WITH REDUCED RESPONSE TO VIBRATION AND STRESS CONCENTRATION

STATEMENT OF GOVERNMENT INTEREST

The invention described herein may be manufactured and used by or for the government of the United States of America for governmental purposes without the payment of royalties thereon or therefore.

BACKGROUND OF THE INVENTION

This invention relates to pressure sensitive hydrophone and more particularly to a decoupled pressure sensitive hydrophone which provides an undiminished acoustic sensitivity and simultaneously a reduced sensitivity to other disturbances induced in the material surrounding the hydrophone element.

In all underwater acoustic detection systems subjected to flow and/or vibration excitation, interfering noise is generated in the pressure sensitive hydrophone due to these sources of excitation in the structure immediately surrounding the hydrophone, which usually is some sort of flexible potting material. This causes degradation of acoustic signal detection capabilities of the detecting system. These sources of noise have long been recognized as a major problem in all underwater sound detecting systems used for a variety of purposes from detection of shipping to seismic streamer arrays used to survey the geological formations. In the past a variety of vibration isolation mounts and accerlation cancelling hydrophone designs have been attempted to minimize hydrophone response to undesired signals induced by flow and/or vibrational excitation. However, these attempts have involved costly and elaborate mounting schemes. However, no sucessful attempt has been made to construct a hydrophone that specifically minimizes the usual local stress concentrations in the potting material in the immediate vicinity of a hydrophone element when the hydrophone is located in an environment subject to flow and/or vibrational excitation. Furthermore, no sucessful attempt has been made to construct a hydrophone assembly that effectively decouples the hydrophone element from waves induced in the material surrounding the hydrophone element due to spurious mechanical excitation. It is therefore, desirable to have a hydrophone assembly which works with undiminished acoustic sensitivity, but which is effectively decoupled from these undesired noise signals.

SUMMARY OF THE INVENTION

The objects and advantages of the present invention are accomplished by utilizing an improved hydrophone assembly which comprises a ceramic element surrounded by a rigid barrier in such a manner as to preclude the arrival at the ceramic element of undesired waves induced in the material surrounding the hydrophone and to prevent the generation of local stress concentration in the vicinity of the ceramic element by providing a more rigid structure capable of transmitting any undesired tensional or compressional forces pass the ceramic element without resulting in any output by the ceramic element. The rigid structure essentially comprises a metallic cage which is milled out of a single piece of metallic stock and includes two thin end discs connected by a plurality of narrow webs of the metal. The cylindrical ceramic element which does not touch the cage is centered therein by means of several small wedges of a flexible epoxy material and subsequently the cage is filled with the flexible epoxy material. In a towed array, a plurality of the finished hydrophone assemblies are then bonded inside a tube of the array with the flexible epoxy material used to separate various hydrophone assemblies inside the tube.

An object of this invention is to provide a hydrophone assembly with a significant decoupling capability from waves induced in its surrounding material by flow and/or vibration and with undiminished acoustic sensitivity.

Another object of this invention is to minimize local stress concentrations in the material immediately adjacent the hydrophone element when the material in which the hydrophone assembly is imbedded is subjected to stress.

Still another object of this invention is to provide some measure of acceleration cancellation inside the hydrophone assembly.

Still another object of this invention is to configure a hydrophone assembly which can be used in a moored, towed or ship mounted configuration for use in any type of underwater acoustic listening device wherein the response to vibration and/or flow induced excitation must be reduced while the acoustic sensitivity of the system is maintained.

Other objects, advantages and novel features of the invention will become apparent from the following detailed description of the invention when considered in conjunction with the accompanying drawings wherein:

DESCRIPTION OF A PREFERRED EMBODIMENT

Figure 1:
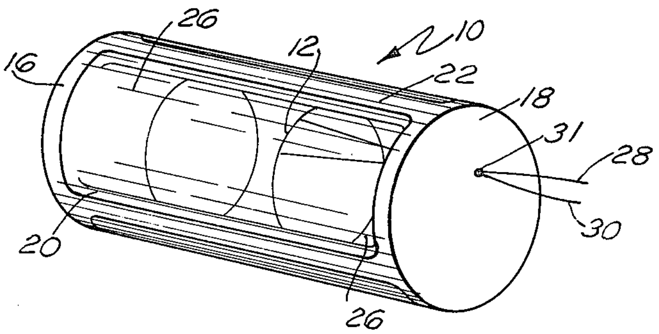
FIG. 1 is a perspective view of one of the hydrophone assemblies.
Figure 2:
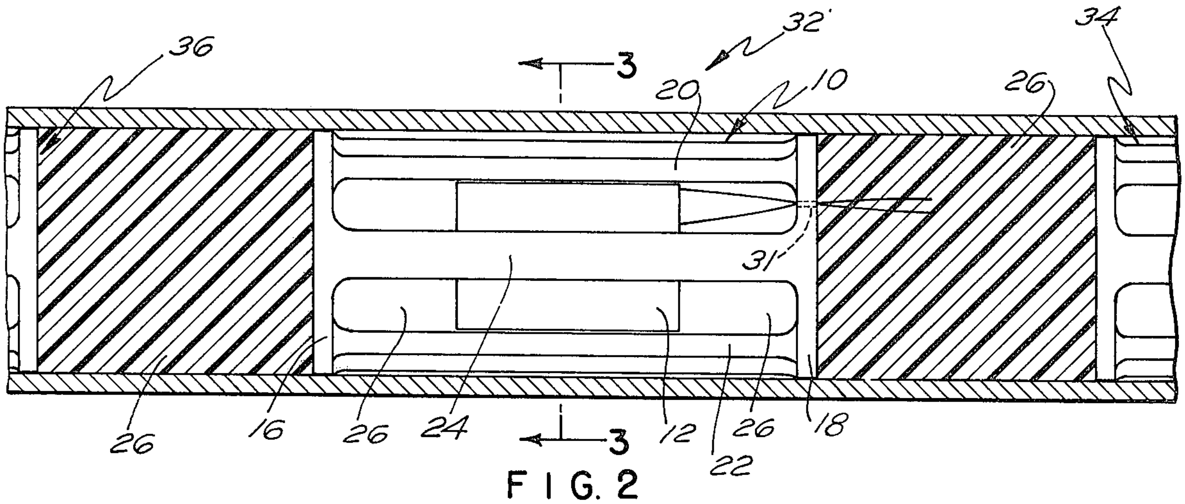
FIG. 2 is a cross sectional view of an array having a plurality of hydrophone assemblies.
Figure 3:
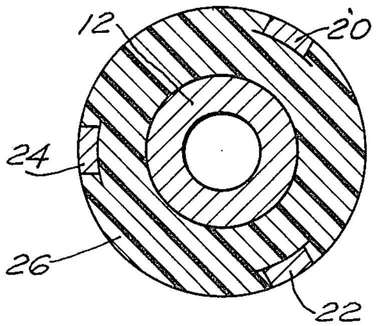
FIG. 3 is a cross sectional view of FIG. 2 across line 3—3 of FIG. 2.

Referring to the drawings wherein like reference characters designate identical or corresponding parts throughout the several views, and more particularly to FIG. 1 thereof, a perspective view of one of the hydrophone assemblies is shown. As shown in FIG. 1 numeral 10 indicates a hydrophone assembly designed for use in a towed hydrophone streamer array. Hydrophone assembly 10 comprises a polarized end-capped, air backed cylindrical ceramic element 12 which is centered inside an aluminum cage-like housing 14 which may be milled out of single piece or otherwise. Cage-like housing 14 comprises two solid discs 16 and 18 at the ends of the cage and of diameter equal to inside diameter of the tube of an array. Discs 16 and 18 are rigidly connected by three aluminum webs 20, 22 and 24. Ceramic element 12 is housed inside the aluminum cage-like housing 14 and the interior space between the ceramic element 12 and the cage-like structure 14 is filled with a flexible epoxy material 26 so as to produce a cylindrical caged hydrophone assembly of diameter equal to the inside diameter of the tube of the array. The hydrophone assembly 10 is then inserted into the array tube and bonded in place utilizing flexible epoxy material 26. Electrical leads 28 and 30 from the ceramic element are passed through a small hole 31 in disc 18 of the cage-like structure 14 and led to a desired point in the array. As shown in FIG. 2, the additional hydrophone assemblies 34 and 36 are located at desired points within array 32 in a similar manner, the space between various hydrophone assemblies being filled with the flexible epoxy material 26. Alternatively, the various hydrophone assemblies can be separated inside the array by using a fluid such as an oil instead of an epoxy material. FIG. 3 indicates a cross sectional view of FIG. 2 taken across line 3—3 and shows the ceramic element 12 and the metalic cage-like structure 14 and having cage ribs 20, 22 and 24.

Thus a decoupled hydrophone assembly according to the teachings of this invention comprises a cylindrical ceramic element housed in a cage-like rigid structure including a number of longitudinal ribs having two cylindrical discs at its ends. The ceramic element is potted inside the rigid cage-like structure by using a flexible epoxy material. Such hydrophone assemblies can be potted inside an array by using a flexible epoxy material to keep the hydrophone assemblies in position. Alternatively, a liquid can also be used instead of a flexible epoxy material as the fill, inside both the array and the hydrophone assembly. The construction of the hydrophone assembly permits the construction of a towed hydrophone array that employs either an elastic material or a liquid and which will have hydrophone noise levels considerably lower than here-to-fore achievable. In addition to providing a reduction in hydrophone response to flow and/or vibrational excitation, the cage-like structure further affords a reasonable degree of mechanical protection to the ceramic element which in certain application is of great importance. This feature of mechanical strength also permits a new construction technique for towed line arrays utilizing an extrusion process.

Obviously many modifications and variations of the present invention are possible in the light of the above teachings. For example, it is possible to use a liquid material such as an oil to use as a fill material instead of a flexible epoxy material. Furthermore, the rigid structure can be other than a cage-like structure having 3 ribs and having 2 discs welded at the ends thereof. The cage can be made out of non-metallic material. It is therefore understood that within the scope of the appended claims the invention may be practiced otherwise than as specifically described.

I claim:

1. An acoustic array including a longitudinal tube having a plurality of hydrophone assemblies mounted therein, each of said hydrophone assemblies comprising:

- a structure including a plurality of longitudinally disposed ribs secured by a pair of discs at the ends thereof;
- an electro-acoustic transducer element housed in said structure; and
- an elastic fill material for maintaining said transducer element in place in said structure, said fill material being potted in said structure, thereby reducing vibration and flow noise, and enhancing mechanical protection.

2. The acoustic array of claim 1 wherein said plurality of hydrophone assemblies are maintained in position by using a flexible epoxy material inside said tube.

3. The acoustic array of claim 1 wherein said plurality of hydrophone assemblies are separated by using a liquid material inside said tube.

4. The acoustic array claim 1 wherein said fill material in each of said plurality of hydrophone assemblies includes a flexible epoxy material.

5. The acoustic array of claim 1 wherein said material in each of said plurality of hydrophone assemblies includes a liquid material.

6. The acoustic array of claim 1 wherein said electro-acoustic transducer element in each of said plurality of hydrophone assemblies includes a piezo-electric crystal.

7. The acoustic array of claim 6 wherein said transducer element in each of said hydrophone assemblies has electrical leads thereof passing through one of the pair of discs of said structure.

* * * * *